Patented Apr. 28, 1925.

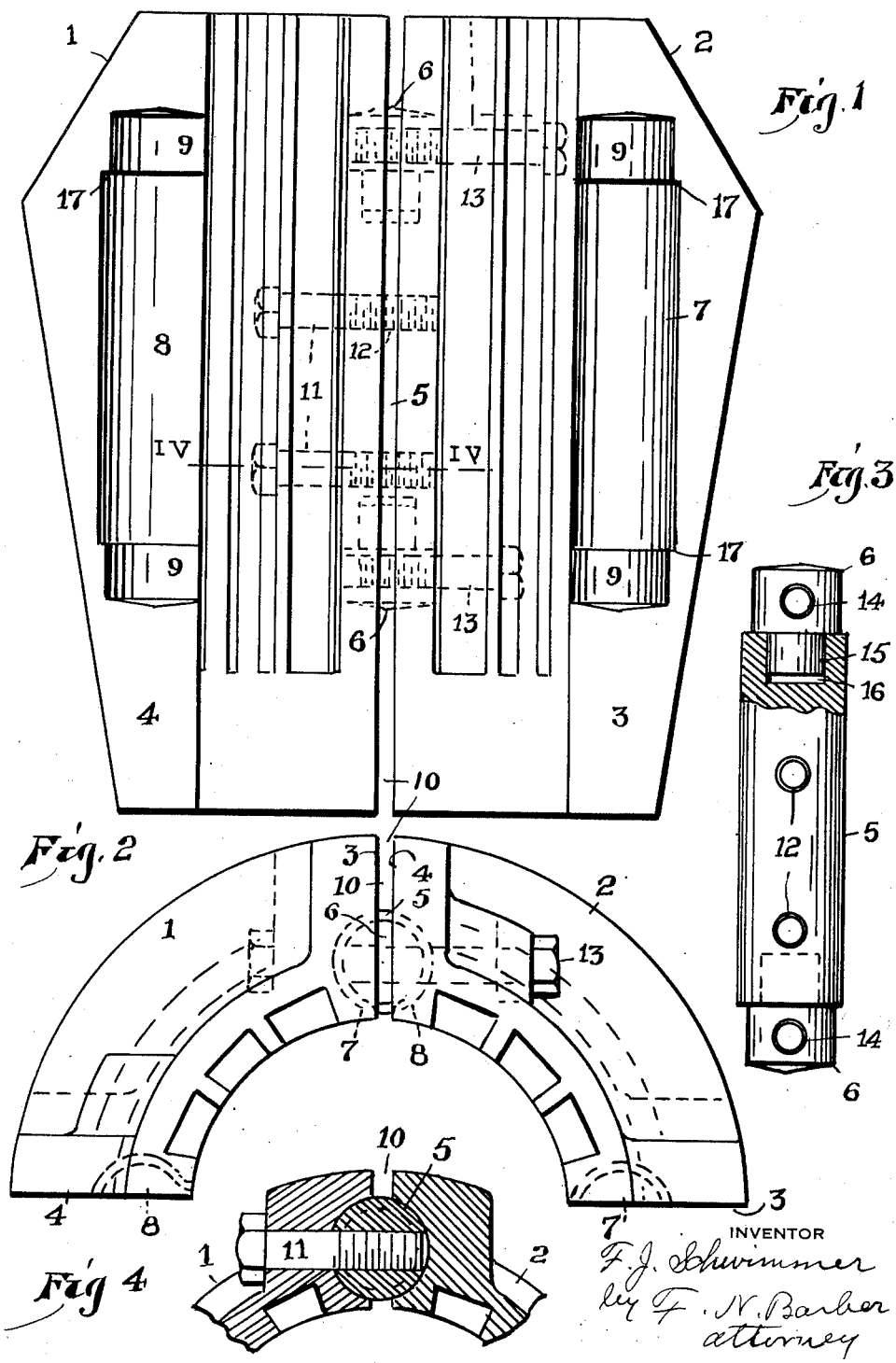

1,535,689

UNITED STATES PATENT OFFICE.

FREDRICK J. SCHWIMMER, OF TOLEDO, OHIO, ASSIGNOR TO THE NATIONAL SUPPLY COMPANY, OF TOLEDO, OHIO, A CORPORATION OF OHIO.

DRILL-PIPE SLIP.

Application filed October 16, 1924. Serial No. 744,013.

*To all whom it may concern:*

Be it known that I, FREDRICK J. SCHWIMMER, a citizen of the United States, residing at Toledo, in the county of Lucas and State of Ohio, have invented new and useful Improvements in Drill-Pipe Slips, of which the following is a specification.

My invention relates to slips for rotary drill pipe. The principal object thereof is to provide novel hinge connections between the consecutive slip members. It is an object of this invention to provide for slips hinges which will stand the severe strains to which the slips are subjected by vertical loads, particularly when any one of the segments of the slips is required to take the greater part of the load. Other objects appear hereinafter.

Referring to the accompanying drawing, Fig. 1 is an elevation of two slip segments hinged together, the view being taken toward the interior walls of the segments; Fig. 2 is a top plan view of Fig. 1; Fig. 3 is an elevation partly in section, showing a center hinge pin and one of the cap hinge pins assembled; and Fig. 4 is a section on the line IV—IV of Fig. 1.

On the drawings I show only two segments of a complete circle, it being understood that two or more segments can be hinged to those shown in the same manner as the two segments on the drawing are shown hinged together. The segments are made exactly alike and may be formed by drop forging. The two segments marked 1 and 2 are each included between the quadrants of two concentric circles, the ends 3 and 4 of the segments being connected together by the central pin or hinge member 5 and the two cap hinge members 6. The ends 3 and 4 are provided with opposite longitudinal recesses 7 and 8. These recesses 7 and 8 have reduced extensions 9 at each end. When two segments are assembled with the ends 3 and 4 slightly separated a pair of recesses 7 and 8 stand opposite each other and form nearly a complete cylinder. Also the recesses 9 stand opposite each other and form almost complete cylinders, there being as in the case of the recesses 7 and 8 a slight space 10.

In order to assemble two segments a hinge member 5 is taken and assembled with the two cap members 6, the three members being placed in one of the recesses 7 or 8 and the two associated recesses. Two bolts or lag screws 11 are passed through an opening in the end 4 and into threaded openings 12 in the central hinge member 5 so that the central hinge member 5 is rigidly attached to the end 4 of the segment. The bolts or lag screws 13 are passed through the ends 3 and into threaded openings 14 in the cap members 6.

The cap members 6 are provided with reduced studs 15 which extend into holes 16 in the ends of the central hinge member 5. The screws 13 connect the cap members 6 rigidly to the ends 3 of the segments and the studs 15 and the holes 16 prevent the separation of the central and the cap hinge members.

It will be observed that the cap hinge members are slightly smaller than the central hinge members, so that there are shoulders 17 provided at each end of the recesses 7 and 8, these shoulders taking the end thrust which any segment may have in excess of that borne by the adjacent segment. The bolts 11 and 13 do not bear any of the strain due to casing gripped by the circle of segments when used in the ordinary manner. I have shown the usual gripping members applied to the concave faces of the segments, these being old and well known.

I claim:

1. Two consecutive slip segments having at their opposing ends registering recesses, a central hinge-member seated in the intermediate portions of the registering recesses of one segment and having holes in its ends, end hinge members seated in the end portions of the registering recesses of the other segment and having studs in the said holes in the central hinge member, means connecting the central member to one segment, and means connecting the end members to the other segment.

2. Two consecutive slip segments having at their opposing ends registering recesses, a central hinge-member seated in the intermediate portions of the registering recesses of one segment and having holes in its ends, end hinge members seated in the end portions of the registering recesses of the other segment and having studs in the said holes in the central hinge member, means fastening the central member to one segment, and means fastening the end members to the other segment, the recesses having shoulders for engagement with the ends of the central hinge member and for receiving longitudinal thrusts applied to either slip segment.

3. Two consecutive slip segments, a central hinge member connected to one segment and having holes at its ends, end hinge members having studs in the said holes, and bolts connecting the end hinge members to the remaining segment.

4. Two consecutive slip segments, a hinge member having a hole at one end, a second hinge member having a stud in the said hole, and means attaching the hinge members respectively to the segments, the means for so attaching one of said hinge members being a bolt.

In testimony whereof I hereunto affix my signature this 9th day of October, 1924.

FREDRICK J. SCHWIMMER.